MAP MATCHING GUIDANCE SYSTEM

Filed Oct. 22, 1965

2 Sheets-Sheet 1

ROBERT P. MOORE
INVENTOR.

BY T. M. Phillips
J. M. St. Amand
ATTORNEYS

Feb. 10, 1970 R. P. MOORE 3,494,577

MAP MATCHING GUIDANCE SYSTEM

Filed Oct. 22, 1965 2 Sheets-Sheet 2

ROBERT P. MOORE
INVENTOR.
BY
ATTORNEYS

United States Patent Office 3,494,577

Patented Feb. 10, 1970

3,494,577
MAP MATCHING GUIDANCE SYSTEM

Robert P. Moore, Riverside, Calif., assignor to the United States of America as represented by the Secretary of the Navy Filed Oct. 22, 1965, Ser. No. 502,714
Int. Cl. F41g 7/12
U.S. Cl. 244—3.17 8 Claims

ABSTRACT OF THE DISCLOSURE

A map matching guidance system for use in guided missiles so the weapon can be employed against targets of opportunity rather than pre-selected targets. Mapping sensors provide signals which are compared with stored reference information stored in an electrostatic tape storage tube. Means are provided to provide continuous display to allow matching over any frame size.

The invention herein described may be manufactured and used by or for the Government of the United States of America for governmental purposes without the payment of any royalties thereon or therefor.

The present invention relates to map-matching guidance systems and more particularly to map-matching guidance systems with electronic storage and continuous display.

Automatic map matchers have been previously employed with mapping sensors, chiefly radar, for guidance. The major equipment limitations have been in the display of the sensor output and storage of the reference map. In the mechanical-optical systems displays have been either cathode ray tubes or storage tubes. Depending on the approach used, the displays have limited correlation to a single spot or line or required that correlation be made one fixed frame at a time. In addition, there were problems with uneven illumination of the display, geometric distortions, and interruptions dut to retrace problems.

Storage in past operational systems has always taken the form of film strips. This requires a bulky film transport and film magazine. Even the so called all electronic matchers require these items plus a flying spot scanner and associated optics. The film with its required processing makes on the spot production and entering of references all but impractical.

Some developmental systems use electrical-in-electrical-out-storage tubes. These tubes, however, store only one reference frame, severely limiting the course length.

The principal new features of the system are the employment of the continuous display and the electrostatic tape storage tube. The display will allow matching over any frame size and eliminate problems such a geometric distortions, uneven illumination, interruptions, etc., caused by retrace and framing problems in previous systems.

The use of an electrostatic storage tube for reference storage adds greatly to the flexibility of the system and reduces complexity and size. Formerly, changes in reference material could only be accomplished by changing film magazines. Furthermore, such information had to be prepared considerably in advance of launch due to film processing and restriction of the media from which the data could be taken. This system will allow the data to be entered just prior to launch. The information may be entered either optically or electronically. The optical information can be either in the form of transparencies or prints. Such information might be aerial photos, high resolution radar maps, or infrared maps. The electronic input may be from a flying spot scanner system which either reproduces reference material directly or processes ordinary map material to obtain synthetic references. With electronic inputs, the reference information may be entered remotely. Also, there is the possibility of real time reference production. Thus, the output from a high resolution radar may be processed and fed directly into the reference storage for use by the missile guidance system employing another sensor for navigation to the target.

The electrostatic tape storage can be seen to offer huge advantages over previous systems. Formerly, such a system was restricted to pre-selected targets. Using this technique, the weapon can be employed against targets of opportunity, using whatever reconnaissance or map material is at hand. This device removes the major limitation of map matching guidance systems in tactical operations. It will also greatly add to the flexibility of strategic systems by allowing courses and targets to be selected on demand rather than being pre-selected and thus fixed.

An object of the present invention is to provide a map-matching guidance system which overcomes the disadvantages of known systems.

Another object is to provide a novel map-matching guidance system which employes an electronic reference storage and provides a continuous display.

Other objects and many of the attendant advantages of this invention will become readily appreciated as the same becomes better understood by reference to the following detailed description when considered in connection with the accompanying drawings wherein.

Figure 1:
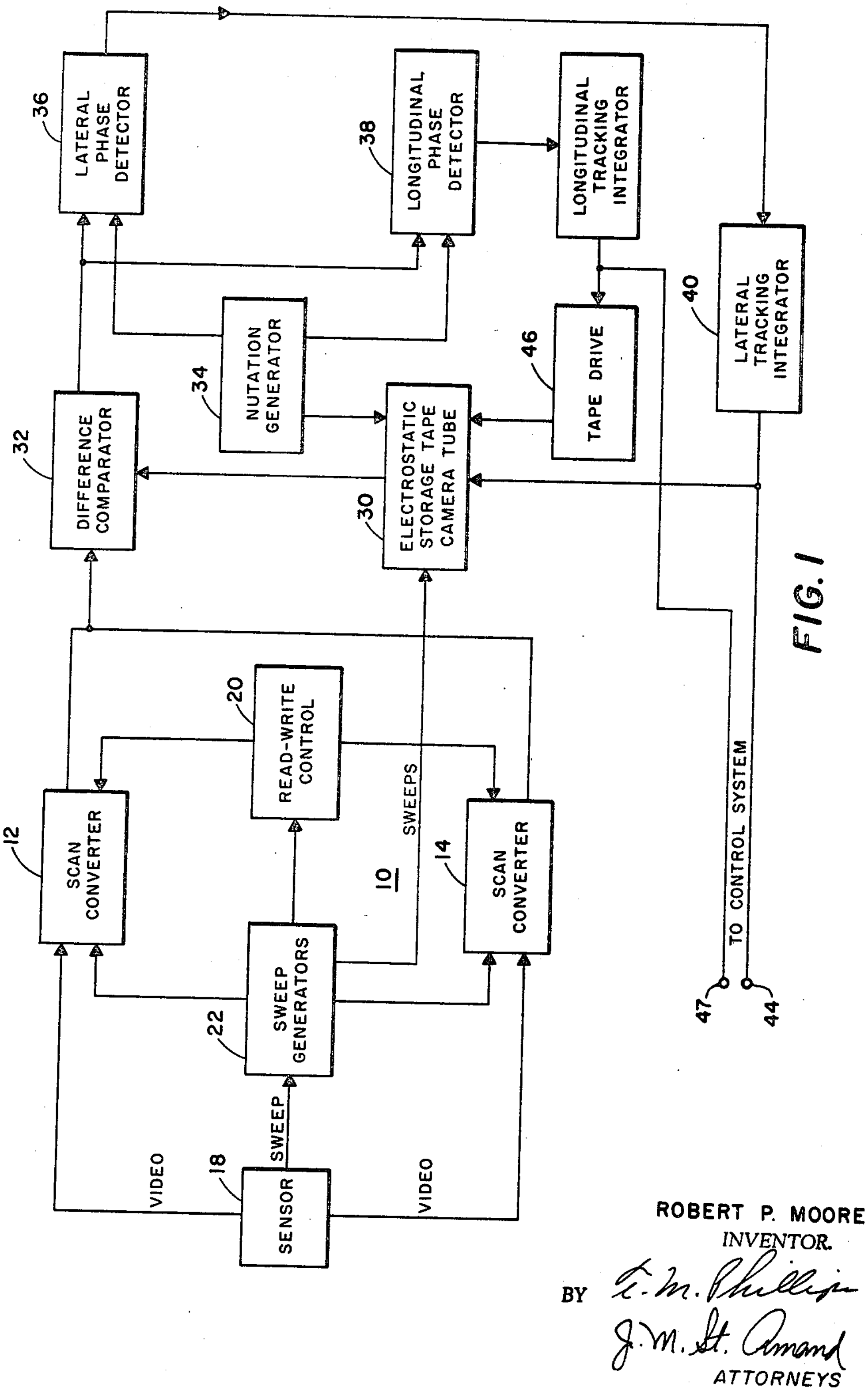
FIG. 1 is a block diagram of the automatic map-matching guidance system.

Display system 10 is basically comprised of two scan converter storage tubes 12 and 14 which are capable of simultaneous read and write and may be of the Westinghouse WX 4640 type. Signals received at antenna 16 are processed in sensor 18, which may be a microwave radiometer, infrared scanner, etc., to produce video signals which are fed to scan converters 12 and 14. The video signals from sensor 18 are written into first scan converter 12 and then into scan converter 14 under control of read-write control 20 which also controls erasing operations. Read-write control 20 is triggered by sweep signals from sweep generators 22. While information is being read from scan converter 12, it is being erased from scan converter 14 in preparation for writing in new information.

Figure 2:
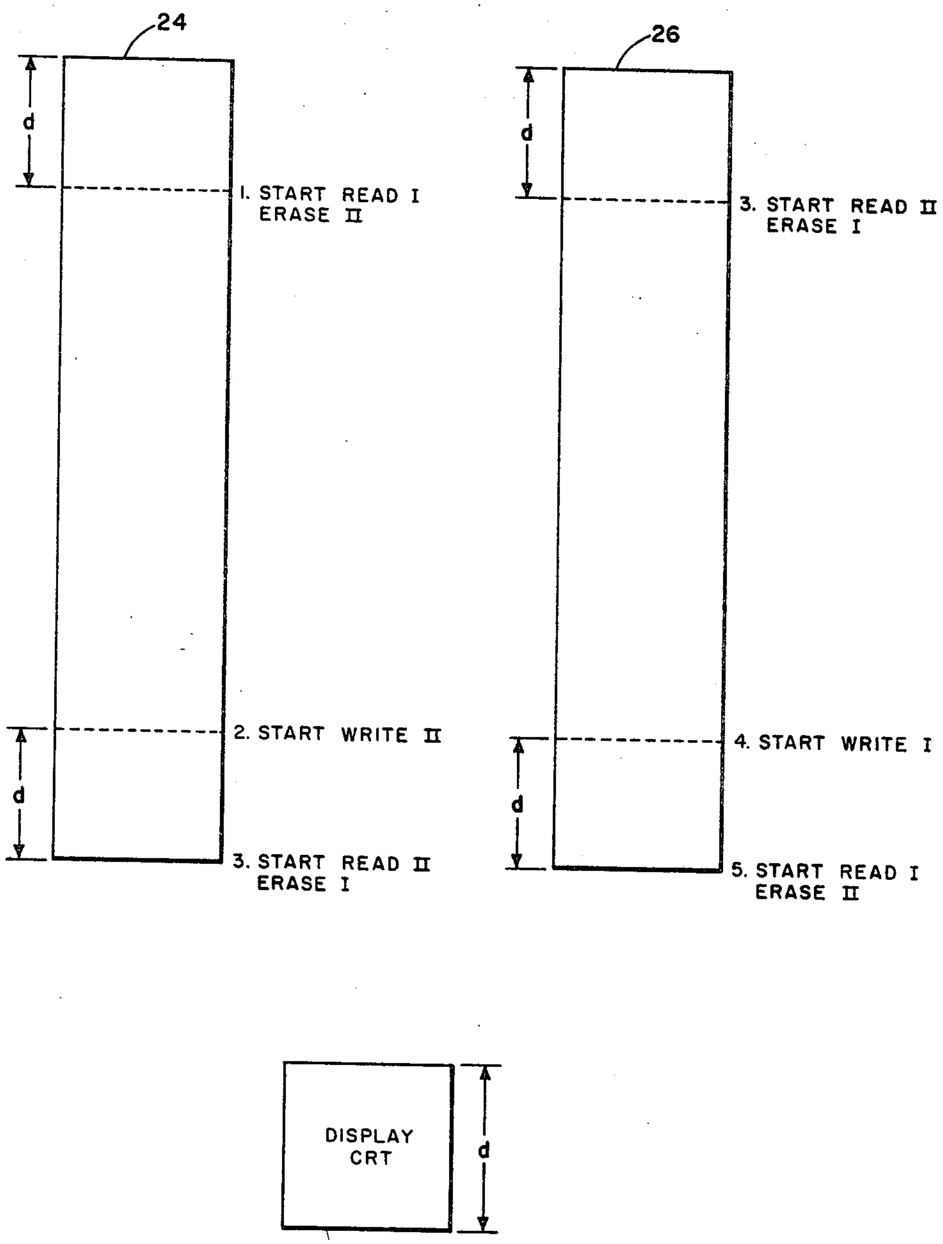
FIG. 2 is a diagram of the storage surfaces used in the system of FIG. 1.

The sequence of operations can best be understood by reference to FIG. 2 which shows diagrams 24, 26 of the storage surfaces in the scan converters or storage tubes 12 and 14 respectively. The broken lines on storage areas 24 and 26 denote positions of the writing scan. The distance, *d*, is a frame length. The operation starts with tube 12, and when one frame has been read into tube 12. an erase signal is applied to tube 14, readying it for later writing operations. At this point continuous read-out of the frame in tube 12 is initiated. The read frame rate is very rapid, near television scan rates, compared to the write rate. Read frame, *d*, will progress down storage area 14 at the same rate as the write scan which is simultaneously entering new information. The last line of the read frame will always be the line of new information being written by sensor 18.

When the bottom of the frame (the line being written) reaches point 2 on storage area 24, tube 14 will begin writing information from sensor 18 as indicated at point 3 on storage area 26. When the frame reaches point 3 on storage area 24, reading of tube 14 is initiated and erase signals are applied to tube 12. Tube 14 will now be writing and reading information in the same manner as tube 12 described above. When the frame reaches point 4 on storage area 26, tube 12 starts writing again; and when the frame reaches point 5 on area 26 and point 1 on area 24, area 26 is erased and reading is initiated in tube 12. The process is then repeated.

The output of display system 10 is a video signal which is fed into a difference comparator 32. The read sweep signals are fed to an electrostatic storage tape tube 30, which may be of the Westinghouse type. This synchronizes the video of this device to that of the display. The output from tape storage tube 30 is fed to the difference comparator 32 where the signal is compared with the video produced by display system 10. An A.C. output signal is produced at the output of comparator 32 since the output from nutation generator 34 is applied to the deflector circuits of tape storage tube 30 to nutate its reading beam to introduce cyclic mismatch or differences in the two video signals. The output signal from difference comparator 32 is fed to lateral and longitudinal phase detectors 36 and 38 respectively where the A.C. signal is phase detected against the nutator reference signals from nutation generator 34. Lateral and longitudinal phase detectors produce D.C. signals whose signs give direction sense and whose amplitudes give a measure of course error. These D.C. error signals are integrated respectively in lateral and longitudinal tracking integrators 40 and 42 to produce steering signals at terminals 44 and 47. Longitudinal error signal is also used to control tape drive 46 and the lateral error signal is also used to control the sweep of tube 30 register the display and reference.

What is claimed is:

1. For use in a guidance system of the map-matching type with electronic reference storage and continuous display, the combination comprising:

(a) a source of video signals representing a field of view being scanned, (b) scan converter means coupled to said video source for converting said video signals to a display of the field of view and for generating output video representing said display, (c) electrostatic storage means for storing information peculiar to the field of view that is being scanned and for scanning said stored information to produce video signals representing said stored information, (d) circuit comparator means coupled to said scan converter means and to said electrostatic storage means for producing output signals proportional to the mismatch of the input video signals, (e) circuit means coupled to said circuit comparator means for generating control signals in response to the output signals from said circuit comparator means.

2. The system of claim 1 wherein said scan converter means includes first and second scan converter tubes programed to alternately read and write to provide a continuous display of the field of view scanned.

3. The system of claim 2 wherein said electrostatic storage means is an electrostatic storage tape tube.

4. The system of claim 3 wherein control signals are coupled to said electrostatic storage tape tube for up-dating the storage tape to agree with the field of view being scanned.

5. For use in a guidance system of the map-matching type with electronic reference storage and continuous display, the combination comprising:

(a) a source of video signals representing a field of view being scanned, (b) scan converter means coupled to said video source for converting said video signals to a display of the field of view and for generating output video representing said display, (c) electrostatic storage means for storing information peculiar to the field of view that is being scanned and for scanning said stored information to produce video signals representing said stored information, (d) circuit comparator means coupled to said scan converter means and to said electrostatic storage means for producing output signals proportional to the mismatch of the input video signals, (e) lateral phase detector means coupled to said circuit comparator means for generating output signals proportional to the lateral displacement of the field of view with respect to the stored information in said electrostatic storage means, (f) longitudinal phase detector coupled to said circuit comparator means for generating output signals proportional to the longitudinal displacement of the field of view with respect to the stored information in said electrostatic storage means.

6. The system of claim 5 wherein said scan converter means includes first and second scan converter tubes programmed to alternately read and write to provide a continuous display of the field of view scanned.

7. The system of claim 6 wherein said electrostatic storage means is an electrostatic storage tape tube.

8. The system of claim 7 wherein the longitudinal error signal is coupled to said electrostatic storage tape tube for up-dating the storage tape to agree with the field of view being scanned.

References Cited

UNITED STATES PATENTS

| | | | |
|---|---|---|---|
| 2,847,855 | 8/1958 | Berger | 73—178 |
| 3,082,294 | 3/1963 | Dean | 178—6.8 |
| 3,102,260 | 8/1963 | Mihelich | 343—5 |
| 3,103,008 | 9/1963 | Mooney | 343—5 |
| 3,192,522 | 6/1965 | Burtner | 343—5 X |
| 3,275,747 | 9/1966 | Hall | 178—6.8 |

VERLIN R. PENDEGRASS, Primary Examiner